G. S. HACKER.
Car Truck.
No. 7,140.
Patented Mar. 5, 1850.
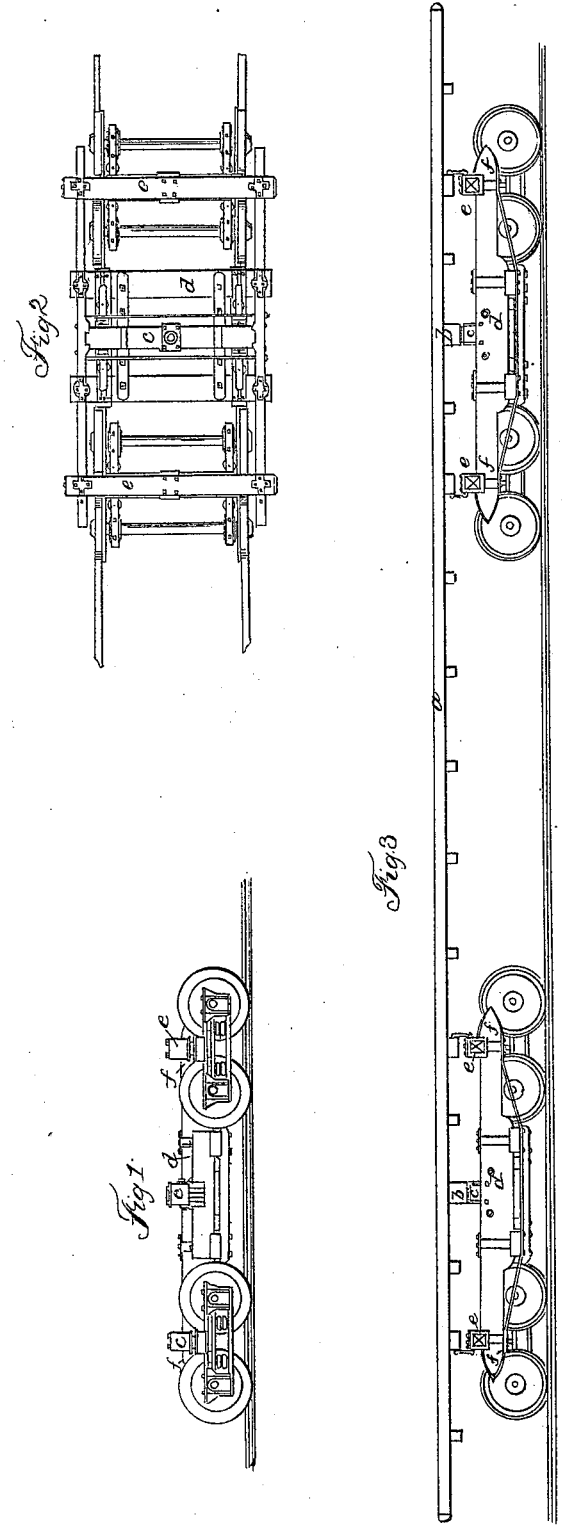

UNITED STATES PATENT OFFICE.

GEO. S. HACKER, OF CHARLESTON, SOUTH CAROLINA.

RAILROAD-CAR.

Specification of Letters Patent No. 7,140, dated March 5, 1850.

*To all whom it may concern:*

Be it known that I, GEORGE S. HACKER, of the city and county of Charleston and State of South Carolina, have invented certain new and useful Improvements in Railroad Cars or Carriages, and that the following is a full, clear, and exact description of the principle or character, which distinguishes them from all other things before known and of the manner of making, constructing, and using the same, reference being had to the accompanying drawings, making part of this specification, in which—

Figure 1 is a side elevation of my improved car without the body thereof; Fig. 2, is a plan of one of the compound trucks thereof; and Fig. 3 a side elevation thereof.

The same letters indicate like parts in all the figures.

The principle of my invention consists in supporting each end of the platform of the car, and connecting it by turning joints with a secondary platform, which secondary platforms are in turn supported near each end on, and connected each by turning joints with two four wheeled trucks, whereby I am enabled to make rail road cars of much greater length than heretofore, while at the same time they are better adapted to run on curves with safety, and the lateral and vertical vibrations given to the wheels do not produce so great an effect on the body of the car.

In the accompanying drawings (*a*) represents the main platform on which the body of the car is to be erected, and (*b*, *b*,) two bolsters extending across the bottom thereof and at the proper distance from each end thereof as shown in the drawings. Each of these bolsters are connected with a counter bolster (*c*) in the same manner as the body of the usual eight wheeled rail road cars are now connected with their trucks, the said counter bolsters being attached to the top of a frame (*d*) or secondary platform, but composed simply of longitudinal and transverse timbers.

The end cross timbers (*e*, *e*,) of each of the secondary platforms constitute bolsters which are connected each with the counter bolster (*f*) of a four wheeled truck of the usual construction, such as is used on what are termed the eight wheeled cars so that each truck may be free to turn in the ends of the secondary platform independently of the others, there being four such trucks under my improved car.

As there is not anything claimed as new in the manner of constructing the trucks or in their connections with the secondary platforms, nor in the manner of connecting the secondary platforms with the main platform of the body of the car, the above description of these together with the accompanying drawings it is believed enable any one skilled in the art of constructing rail road cars to construct and use my invention and to make such modifications in the construction of the several parts and in the manner of connecting them as may be suggested by varying circumstances, but always within the principle of my invention.

It will be seen from the foregoing and on inspection of the drawings making part of these presents, that when a car comes onto a curve the first truck will turn under the forward end of the secondary platform while the second truck still remains on the straight part of the track, and as the forward truck advances on the curve it will gradually turn this secondary platform which in turning swivels on the center of the second truck, and that this motion of the forward secondary platform or compound truck as it may be termed by its connection with the forward part of the main platform gradually draws it around by a leverage purchase equal to the length of the secondary platform the fulcrum of this lever being at the center of the connection with the second truck while the resistance is at the joint of connection between the main and secondary platforms thus doubling the purchase of the force which is exerted to turn the car, the center of motion of the main platform during this part of the operation being at the point of its connection with the rear secondary platform. As the second truck reaches the curve it turns under the forward secondary platform to come into the line of the radius of the circle. And that when the third and further trucks reach in turn the curve the same thing will take place until all the trucks, secondary and the main platforms are brought in the line of their appropriate radii of the circle. In this way the resistance which the several trucks encounter causes them to follow the curve will be greatly reduced, and hence the danger of running off the track must be reduced. And it will also be seen that when any of the wheels meet with, and has to move vertically or laterally to pass any obstruction or irregularity in the road, the motion communicated to the platform of the car will be greatly reduced, for if (as an example) the forward wheels are elevated one inch the forward end of the secondary platform will be elevated only half an inch and that part of the main platform which rests upon it only a quarter of an inch; the same reasoning applying to lateral vibrations.

Having thus pointed out the nature or principle of my invention, the manner of constructing and using the same, and the advantages thereof, what I claim as my invention and desire to secure by Letters Patent is—

Supporting and connecting both ends of the main platform of a rail road car, each with the centers of secondary platforms, which secondary platforms are connected at each end with and supported each on four wheeled trucks, all substantially in the manner and for the purpose specified.

GEORGE S. HACKER.

Witnesses:
JNO. HENON,
W. H. GIBSON.